(12) United States Patent
Klug et al.

(10) Patent No.: US 11,354,374 B2
(45) Date of Patent: *Jun. 7, 2022

(54) METHOD, SERVER AND SOFTWARE PRODUCT FOR CONTROLLING PHYSICAL-SIDE BROWSER FUNCTIONS OF REMOTE DESKTOP OR VIRTUAL DESKTOP ENVIRONMENTS

(71) Applicant: RingCentral, Inc., Belmont, CA (US)

(72) Inventors: Karl Klug, Miesbach (DE); Viktor Ransmayr, Munich (DE); Juergen Totzke, Poing (DE)

(73) Assignee: RingCentral, Inc., Belmont, CA (US)

( * ) Notice: Subject to any disclaimer, the term of this patent is extended or adjusted under 35 U.S.C. 154(b) by 108 days.

This patent is subject to a terminal disclaimer.

(21) Appl. No.: 16/694,094

(22) Filed: Nov. 25, 2019

(65) Prior Publication Data
US 2020/0117693 A1   Apr. 16, 2020

Related U.S. Application Data

(63) Continuation of application No. 15/571,366, filed as application No. PCT/EP2016/059788 on May 2, 2016, now Pat. No. 10,546,037.

(51) Int. Cl.
*G06F 16/957* (2019.01)
*G06F 9/54* (2006.01)
(Continued)

(52) U.S. Cl.
CPC ............ *G06F 16/957* (2019.01); *G06F 9/452* (2018.02); *G06F 9/45529* (2013.01);
(Continued)

(58) Field of Classification Search
None
See application file for complete search history.

(56) References Cited

U.S. PATENT DOCUMENTS 9,535,560 B1    1/2017  Kominac et al.
2012/0214682 A1 8/2012  Bigwood et al.
(Continued)

OTHER PUBLICATIONS

Adham Zeidan, "WebRTC enabled multimedia conferencing and collaboration solution", 2014, University of Applied Sciences Frankfurt (Year: 2014).*

(Continued)

*Primary Examiner* — Wynuel S Aquino
(74) *Attorney, Agent, or Firm* — Finnegan, Henderson, Farabow, Garrett & Dunner LLP

(57) ABSTRACT

The controlling of accessible browser functions of a physical side of a remote or virtual desktop environment can include:
setting up a virtual desktop infrastructure between a physical unit (1) of a user, on said physical side, and a virtual unit (2) assigned to said user, on a virtual or remote side;
running a first web browser (31) at the physical unit (1) and a second web browser (41) at the virtual unit (2);
establishing a WebRTC data channel (68) between said first and second web browsers (41) running at the physical unit (1) and the virtual unit (2), respectively; and
controlling said browser functions of said first web browser (31) running at the physical unit (1) remotely by said virtual unit (2) utilizing said WebRTC data channel (68) established between the physical unit (1) and the virtual unit (2).

19 Claims, 9 Drawing Sheets

(51) Int. Cl.
  *G06F 9/50*     (2006.01)
  *H04L 67/025*   (2022.01)
  *G06F 9/451*    (2018.01)
  *G06F 16/958*   (2019.01)
  *G06F 9/455*    (2018.01)

(52) U.S. Cl.
  CPC ........ *G06F 9/45533* (2013.01); *G06F 9/5072* (2013.01); *G06F 9/541* (2013.01); *G06F 16/958* (2019.01); *H04L 67/025* (2013.01)

(56) References Cited

U.S. PATENT DOCUMENTS

| | | |
|---|---|---|
| 2015/0039760 A1 | 2/2015 | Yoakum |
| 2015/0039998 A1 | 2/2015 | Lieb et al. |
| 2015/0081796 A1 | 3/2015 | Xu et al. |
| 2015/0304359 A1* | 10/2015 | Balasaygun ........ H04L 65/1006 709/228 |
| 2017/0142588 A1* | 5/2017 | Marjou ................... H04L 67/02 |
| 2017/0214682 A1* | 7/2017 | Yano ....................... G06F 9/452 |

OTHER PUBLICATIONS

Kwok-Fai Ng, "A P2P-MCU Approach to Multi-Party Video Conference with WebRTC", 2014, International Journal of Future Computer and Communication (Year: 2014).*

International Search Report and Written Opinion for PCT/EP2016/059788 dated Jul. 15, 2016.

Third Office Action, dated Aug. 11, 2020, issued in Chinese Patent Application No. 201680026236.X (12 pages).

\* cited by examiner

METHOD, SERVER AND SOFTWARE PRODUCT FOR CONTROLLING PHYSICAL-SIDE BROWSER FUNCTIONS OF REMOTE DESKTOP OR VIRTUAL DESKTOP ENVIRONMENTS

CROSS-REFERENCE TO RELATED APPLICATIONS

This application a continuation application of U.S. patent application Ser. No. 15/571,366, which is the United States national phase under 35 U.S.C. § 371 of PCT International Patent Application No. PCT/EP2016/059788, filed on May 2, 2016, and claiming benefit of priority to German Application No. 10 2015 005 815.0, filed May 6, 2015.

BACKGROUND OF THE INVENTION

Field of the Invention

The present invention relates to a method for controlling accessible browser functions on a physical side of remote desktop or virtual desktop environments such as RDS (Remote Desktop Service) or VDI (Virtual Desktop Infrastructure). The invention also relates to a corresponding software product and server.

Background of the Related Art

Optimized Real-Time Communication (RTC, e.g. OpenScape Desktop Client by Unify) in Remote Desktop Service (RDS)/Virtual Desktop Infrastructure (VDI) environments has to be implemented as vendor-specific Remote Desktop Protocol (RDP) extensions, e.g. Independent Computing Architecture (ICA) as the Citrix-specific variant.

Conventional RTC clients deployed in RDS/VDI environments may experience service degradation due to the missing RTC support in the used RDP. Since a feasible Quality-of-Service (QoS) cannot be achieved for the RTC part of the RDP session, this leads to an unacceptable user experience especially in metropolitan as well as wide area networks. FIG. 1 depicts the general VDI infrastructure according to a prior art softphone solution, exemplified as Citrix version, without specific support for RTC. In particular this prior art example shows an RDS/VDI-unaware softphone solution. Here, a physical unit 1 and a virtual unit 2 are connected via a network 3. The physical unit 1 is exemplified as a Windows-based physical PC (pPC), and the virtual unit 2 is exemplified by a virtual PC (vPC) based on Citrix XenDesktop (XD). The network 3 may be a wide area network (WAN), a metropolitan area network (MAN), or a local area network (LAN). In the context of this application, a LAN may be assumed to be a home or corporate network covering an area of typically up to 3 km, a MAN may be assumed to have a range of typically 10-50 km around some municipality, and a WAN may be assumed to typically have a continental scope. It is to be noted that in general there is no fixed limit in terms of the distances, and the numerical values mentioned above are to be understood in a mere exemplary and illustrative sense.

Specifically, the local unit 1 in this example runs under a physical unit operation system (OS) 4 (here, as a matter of example, Windows). The Citrix solution bases on a native RDS client 5 running on the physical unit (pPC) 1 at the user side. A local device controller (LDC) 6 implemented in the native RDS client 5 is for controlling local devices 8 at the user side via a local media I/O channel 7. On the other (virtual) side, virtual unit 2 is run or emulated by a virtual unit operating system (OS) 9 (here again, as a matter of example, Windows). A SIP softphone client 10 (e.g., an OpenScape PE client) implements a SIP signaling and media engine (SME) 11. SIP SME 11 is enabled to communicate with a third party 14 through a SIP proxy (not shown) via a SIP signaling channel 12 while media data is transmitted according to the RTP protocol via an RTP media channel 13.

The RDS client 5 of physical unit (pPC) 1 communicates with the virtual unit (vPC) 2 via ICA (Independent Computing Architecture) which is a Citrix-promoted VDI protocol. To this end, an ICA endpoint (EP) 16 is implemented in the physical unit RDS client 5, and a further ICA EP 17 is implemented in the virtual unit 2, and an ICA channel is established between both sides' ICA EPs 16, 17. It is to be noted that softphone client 10, here SIP-based, running on vPC 2 has no access to the physical devices 8 of the pPC 1 in respect to RTC. Instead, the ICA channel 18 may be used for "tunneling" RTC payload data to the physical unit 1 so as to make them usable. However, there may be a lot of delay and loss of quality in this payload tunneling. Such problems may become worse with growing distance between the physical unit 1 and the server hosting the virtual unit 2, i.e., in metropolitan and wide area networks.

FIG. 2 shows an existing extension to support RTC in such environments as shown in FIG. 1. Instead of a VDI-unaware SIP softphone client, the virtual unit (vPC) 2 in this extension has a VDI-aware SIP softphone client 20. The softphone client 20 of this extension has a SIP service provider (SIP SP) controller 21 implemented therein. At the physical unit (pPC) 1, the native RDS client 5 (Citrix Receiver or CR, in this example) comprises a CR plug-in 22 for control of the SIP SP controller 21 in conjunction with a so called "head-less SIP softphone" 25 which per se is running independently from the CR plug-in 22 in physical unit 1. The "head-less" SIP softphone 25 has a local media controller (LMC) 26 and a SIP signaling and media engine (SIP SME) 27 implemented therein. The LMC 26 at the physical unit 1 takes the task of the previous local device controller (6 in FIG. 1), in terms of controlling and utilizing local devices 8 at the user side via local media I/O channel 7. Furthermore, the SIP SME 27 at the physical unit 1 provides the SIP signaling via SIP signaling channel 28 as well as control of RTP media data transmission via RTP media channel 29 from and to the third party 14.

Nowadays, there is a trend towards web-based RDS & VDI clients, e.g. the HTML5 Receiver by Citrix. In such environments, the emerging technology WebRTC inherently supported in the browsers should be applicable for implementing RTC in web-based applications. Today, however, WebRTC solutions do not work properly and provide poor user experience if the browser is running in a VDI environment, especially across wide-area networks. Furthermore, existing VDI-enabled softphone solutions always require an individual implementation for each vendor-specific VDI technology and protocol.

For an overview of an overall layered protocol architecture as of IETF and the corresponding APIs as of W3C reference may also be made to FIG. 9 described later in more details. It will be noted that this overall layered protocol architecture may be understood to underly prior art solutions as well as the inventive solutions described later.

FIG. 3 depicts a general outline of a solution where the browser is running on a Remote Desktop Service (e.g. XenApp-based) or a virtual PC (e.g. XenDesktop-based), i.e., the virtual unit 2 in the sense of the present application. The relationship and connection of physical unit 1 and virtual unit 2 resembles that of FIG. 1. However, in the solution assumed in FIG. 3, a web browser 31 is provided on the physical unit (pPC) 1, having a local device controller (LDC) 32 assigned to a local device API (LC API) 33 implemented therein. The LC API 33 takes the task of the previous local device controller (ref. no. 6 in FIG. 1), in terms of controlling and utilizing local devices 8 at the user side via local media I/O channel 7. In this solution, a WebRDS app 15 (e.g., Citrix Receiver for HTML) implemented in the web browser 31 is used instead of a native RDS client (5 in FIGS. 1 and 2). It is to be noted that an app in the sense of this specification is a software application running, e.g., in a web browser. Furthermore, a pPC hardware (HW) layer 34 is assumed at the side of the physical unit 1 on a layer beneath pPC operating system (OS) 4 layer.

At the side of the virtual unit 2, a WebRTC app 35 (e.g., Circuit Web App V1 by Unify) which per se is VDI-unaware is installed. WebRTC app 35 includes a WebSocket (WS) client 36. A web browser 41 is provided at the virtual unit (vPC) 2, having a local device controller (LDC) 42 assigned to a local device API (LD API) 43 implemented therein. It is to be noted, however, that a media I/O channel 44 of LDC 42 is terminated at the vPC operating system 9 level as WebRTC per se only "knows" local devices. A WebRTC media engine 45 assigned to a WebRTC API 46, and a WebSocket Stack 47 assigned to a WebSocket API 48 are implemented in the vPC web browser 41. Furthermore, a vPC hardware (HW) layer 50 is assumed at the side of the virtual unit 1 on a layer beneath a vPC operating system 9 layer.

In this solution, WebSocket stack 47 is enabled to communicate with a WebRTC Server (see, e.g., WebRTC Server 90 in FIGS. 6-8) which controls a session with a third party 14 via a WebSocket signaling channel 49 while media data is transmitted according to the RTP protocol via RTP media channel 13 through WebRTC media engine 45. In the solution assumed according to FIG. 3, as seen above, the VDI-unaware WebRTC-based app 35 has to solve similar issues like a softphone running in a VDI environment. The fact that according to WebRTC definitions standardized W3C browser APIs have to be used, which are not VDI-aware, makes this scenario even more challenging.

In the past, as said in the beginning, vendor-specific Remote Desktop Protocol (RDP) extensions, e.g. Independent Computing Architecture (ICA) as the Citrix-specific variant, have been implemented to enable optimized real-time communication in RDS/VDI environments. In the context of a WebRTC app, this option is not applicable as there is no way to convey local device control from LD API 43 of the virtual unit 2 to the side of the physical unit 1. However, even if the W3C local device API would offer such an option in the future utilizing the ICA channel for decoded WebRTC payload data would not be desirable because it is vendor-specific and would result in QoS-issues, as described above.

The WebRTC standard provides for a secure end-to-end data channel between the communicating RTC parties e.g. for sharing files, gaming, etc., and is unaware of RDS/VDI environments.

BRIEF SUMMARY OF THE INVENTION

Embodiments may provide a method of controlling accessible browser functions on a physical side of a remote or virtual desktop environment such as real-time data handling, which is able to alleviate the drawbacks of the prior art as mentioned above. In particular, embodiments may provide such a method which facilitates the direct and immediate usage of WebRTC in virtual desktop environments such as VDI environments without a VDI vendor-specific implementation, or similar environments like remote desktop environments such as RDS. Further embodiments may provide a software product and a server respectively having the same benefits as a method solving at least one of the aforementioned problems.

One aspect of the invention is a method of controlling accessible browser functions on a physical side of a remote or virtual desktop environment.

The method includes steps of:
  setting up a virtual desktop infrastructure between a physical unit of a user, on said physical side, and a virtual unit associated to said user, on a remote or virtual side;
  running a first web browser at the physical unit and a second web browser at the virtual unit;
  establishing a WebRTC data channel between said first and second web browsers running at the physical unit and the virtual unit, respectively; and
  controlling said browser functions of said first web browser running at the physical unit remotely by said virtual unit utilizing said WebRTC data channel established between the physical unit and the virtual unit.

It will be understood that, as any control is accomplished on browser level, it is independent of any operating system (OS). A remote desktop environment may in particular be embodied as a Remote Desktop Service (RDS) environment, and a virtual desktop environment may in particular be embodied as a Virtual Desktop Infrastructure (VDI) environment, which however should not be construed to limit the present invention in this regard.

DETAILED DESCRIPTION OF THE INVENTION

Figure 1:
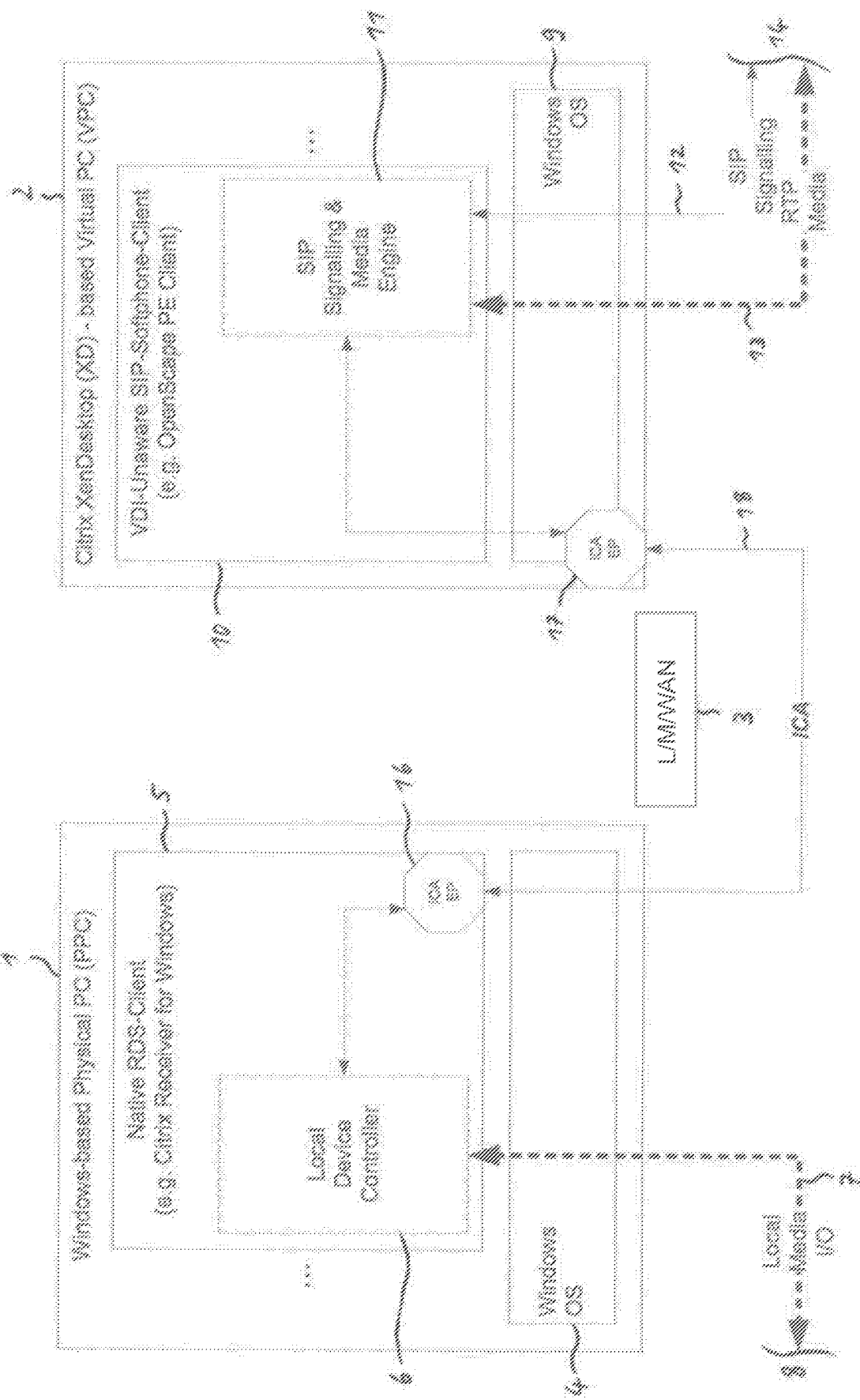
FIG. 1 is a block diagram showing a general VDI infrastructure according to a prior art softphone solution according to a general exemplary embodiment of the present invention.
Figure 2:
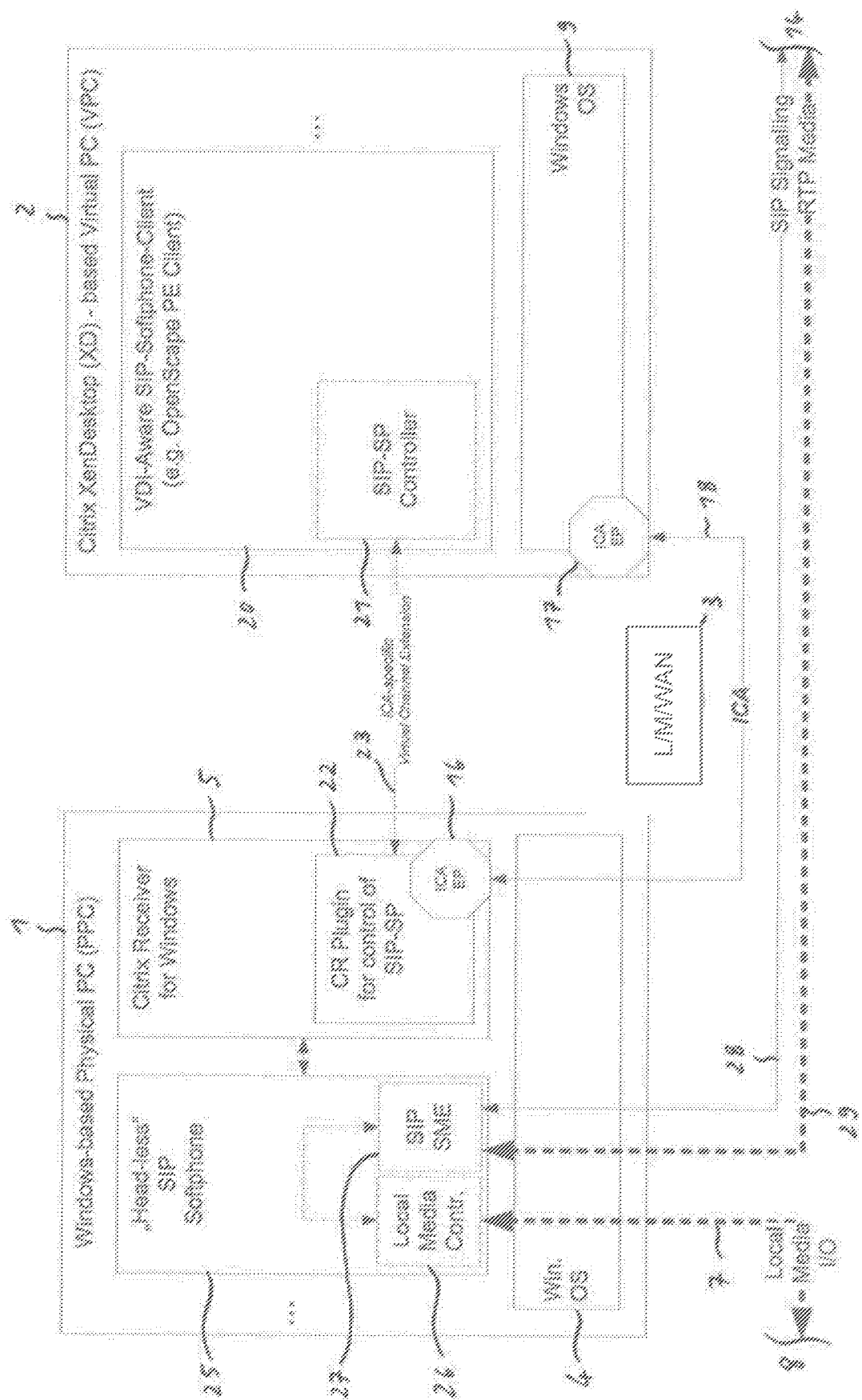
FIG. 2 is a block diagram showing an existing extension to support RTC in such environments as shown in FIG. 1.

In one preferred embodiment, said browser functions relate to real-time data handling remotely at the physical unit. Real-time data in the sense of the present invention may be any data communicated or communicable through a protocol or channel enabled for or dedicated to real-time data communication, in particular, payload communication. In particular, real-time (payload) data may include media data such as audio, video, speech or the like, transaction data, gaming data, control data, and so on.

In one preferred embodiment, said browser functions are controlled by means of a first API implemented at the first web browser, wherein said first API is at least one of: a first local device API utilizing said WebRTC data channel established between the physical unit and the virtual unit invoking media capturing or replaying capabilities of devices of the physical unit, and an RTC peer connection API utilizing said WebRTC data channel established between the physical unit and the virtual unit invoking the corresponding WebRTC protocols establishing a real-time data connection from the physical unit to a third party on behalf of the virtual unit.

The above media capturing capabilities may relate to a microphone and/or camera, and media replaying capabilities may relate to a sound card or graphic card. It will be noted that any API referred to in the context of the present invention are understood in the sense as standardized by W3C, and WebRTC protocols are understood in the sense as standardized by IETF, which however should not limit the present invention in any regard. In this sense, the peer connection API is a WebRTC API as of W3C.

In one preferred embodiment, said WebRTC data channel is established between a first WebRTC media engine enabled and assigned to a first data channel API implemented in said first web browser running at the physical unit and a second WebRTC media engine enabled and assigned to a second data channel API implemented in said second web browser running at the virtual unit. A media engine in the sense of the present invention is understood as a software unit (such as a inherent function, add-on, plug-in, or the like) providing for media stream encoding and decoding capabilities, in particular of a browser, i.e., the first and second web browser, respectively. Again, the first and second data channel APIs are WebRTC APIs as of W3C, respectively.

In a further preferred embodiment, said WebRTC browser functions include controlling a first local device controller for capturing or replay of end-to-end real-time data delivered or received towards the third party, said local device controller being implemented and assigned to a first local device API enabled in said first web browser run at the physical unit.

In a further preferred embodiment, a head-less WebRTC extension is implemented in a WebRDS application implemented in the physical unit. The WebRDS application is in particular implemented in said first web browser running at the physical unit. The head-less WebRTC extension may comprise a data channel server which may co-operate with a first data channel API assigned to said first WebRTC media engine enabled in said first web browser running at the physical unit for termination of the data channel established by the data channel client. In particular, the head-less WebRTC extension may be downloaded JavaScript code which may run as a Web Worker. The method may comprise a step of downloading said WebRDS application to said first web browser running at said physical unit from a WebRDS server where said WebRDS application includes said head-less WebRTC extension. Alternatively, said head-less WebRTC extension is implemented in said first web browser independently from said WebRDS application.

In a further preferred embodiment, a VDI-aware WebRTC application is implemented in the virtual unit. The VDI-aware WebRTC application is in particular implemented in said second web browser running at the virtual unit. The VDI-aware WebRTC application may comprise a WebSocket client which may co-operate with a WebSocket stack implemented and assigned to a WebSocket API enabled in said second web browser run in the virtual unit. The method may comprise establishing a WebSocket signalling channel via a WebRTC server with a third party through said WebSocket stack, wherein said third party may be a source and/or sink of real-time data, in particular RTP media data. The VDI-aware WebRTC application may also comprise a data channel client which may co-operate with a second data channel API assigned to said second WebRTC media engine enabled in said second web browser running at the virtual unit.

The method may comprise a step of downloading said WebRTC application to said second web browser running at said virtual unit from a remote WebRTC server.

In a further preferred embodiment, the method comprises exchanging real-time data with a remote party through said first WebRTC media engine implemented in said first web browser running at the physical unit. Said real-time data may be exchanged in a secure fashion, e.g. via SRTP.

This invention provides a solution for WebRTC-capable browser applications. This solution is VDI-vendor technology-independent and only relies on a co-operating browser or VDI vendor for provisioning of the extension alternatives proposed by this specification.

According to the present invention, in contrast to use the VDI channel also for media conveyance, terminating the media at the physical unit eliminates additional media relay (and corresponding delays) as well as facilitates the usual Quality-of-Service (QoS) support of the media streams as in regular, non-VDI environments. Thus, it provides for a similar user experience regardless whether the WebRTC app is running in VDI or regular environments.

This invention discloses a secure, remote control of these APIs independent from the VDI technologies and protocols in use.

It supports all known use scenarios and can be executed on any device including ubiquitous devices.

Another aspect of the invention is a server configured for providing a virtual desktop unit to a physical unit of a user when connected via a network, having a web browser running at said virtual desktop unit and a WebRTC data channel established between said web browser and a further web browser running at said physical unit, and controlling accessible browser functions of said further web browser running at the physical unit utilizing said WebRTC data channel. In other words, preferably, said server is adapted to execute the method of the first aspect of the invention. The server is understood to be a hardware unit providing said virtual desktop unit to said user or, in particular, to a plurality of users in a plurality of sessions, and said network may be a LAN, MAN, or WAN. Adaptation may be accomplished through programming (software) or construction (hardware). As the server of this aspect is adapted to execute the method of the previous aspect, the device provides any advantage the method provides. It is understood that the further web browser of this aspect corresponds to the first web browser of the preceding aspect, and the web browser of this aspect corresponds to the second web browser of the preceding aspect.

A further aspect of the present invention is a software product for controlling accessible browser functions on a physical side of a remote desktop or virtual desktop environment remotely from a virtual side of such environment, said software product being stored on computer-readable medium, preferably being directly loadable into an internal memory of a computer, and comprising program code for performing the steps of the method of the first aspect when said software product is executed by said computer. Said computer may be configured as a physical unit operated by a user, and a virtual unit providing virtual desktop services to said physical unit, said physical unit and said virtual unit being connected via a network. Said physical unit preferably comprises or is embodied by or included in a telephone, mobile phone, smart phone, PDA, desktop computer, portable computer, tablet computer, or the like, and may be configured to operate as a fat client, thin client or zero footprint client. Said virtual unit is preferably provided by server instance, preferably being represented by a single server, data centre, or cloud having multiple hardware servers at distributed places. It will be noted that the program code may be adapted to alter or extend software existing on said computer. As the software product of this aspect comprises program code for performing the steps of the method of the first aspect, the device provides any advantage the method provides. In particular, the program code may be program code of an operating system, a browser software, an application software such as server application, client application, mobile application, telecommunication software, routing software, an app, plug-in or extension, an update package or service package, and may be included in an installation package.

The present invention may also be embodied by a computer program for controlling accessible browser functions on a physical side in a remote desktop or virtual desktop environment, including instructions causing a computer to perform the steps of the afore-described method when said computer program is loaded in or executed by said computer, and by a digital data carrier having electrically readable control signals which are designed to operate with a programmable computer for controlling accessible browser functions on a physical side in a remote desktop or virtual desktop environment, said control signals being designed and adapted to cause the computer to perform the steps of the afore-described method. Here, the computer may also be embodied by the device of the described aspect of the invention, a communication device, a server such as a collaboration server, call management server, conference server or the like, a personal computer or the like.

Further features, objects, advantages, and details of the present invention will become more apparent from the following description of specific embodiments of the invention and respective illustration in the appended drawings. Obviously, features, objects, advantages, and details of a specific embodiment, its variations and modifications mutatis mutandis apply to other embodiments, variations and modifications unless such application obviously violates technical constraints or laws of nature. Embodiments may be combined with each other, and any combination of an embodiment with another embodiment as a whole or in terms of single features thereof may be assumed to constitute an embodiment of the invention.

Now, the invention will be described in detail in its preferred exemplary embodiments, referring to the accompanying drawings. It is to be noted however that the drawings are purely schematic and not necessarily to scale. The drawings and descriptions are to illustrate the principle underlying the invention, not to limit the same in any way. The present invention is only limited by the appended claims.

A virtual desktop infrastructure (VDI) implementation according to an exemplary embodiment of the present invention is now described with reference to FIGS. 4 through 8.

Figure 4:
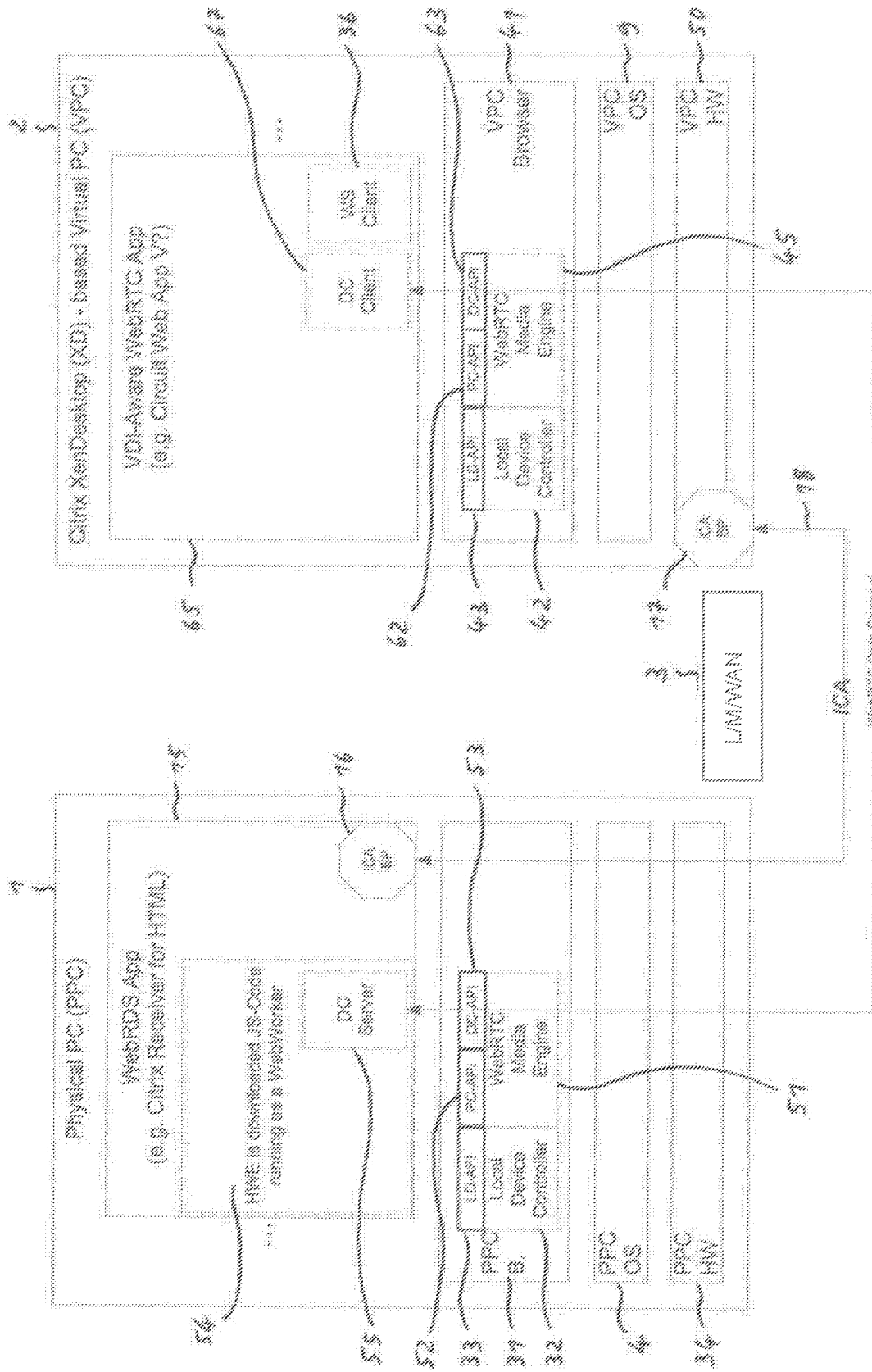
FIG. 4 is a block diagram showing a setting of a virtual desktop infrastructure (VDI) implementation according to an exemplary embodiment of the present invention in an initialization phase.
Figure 5:
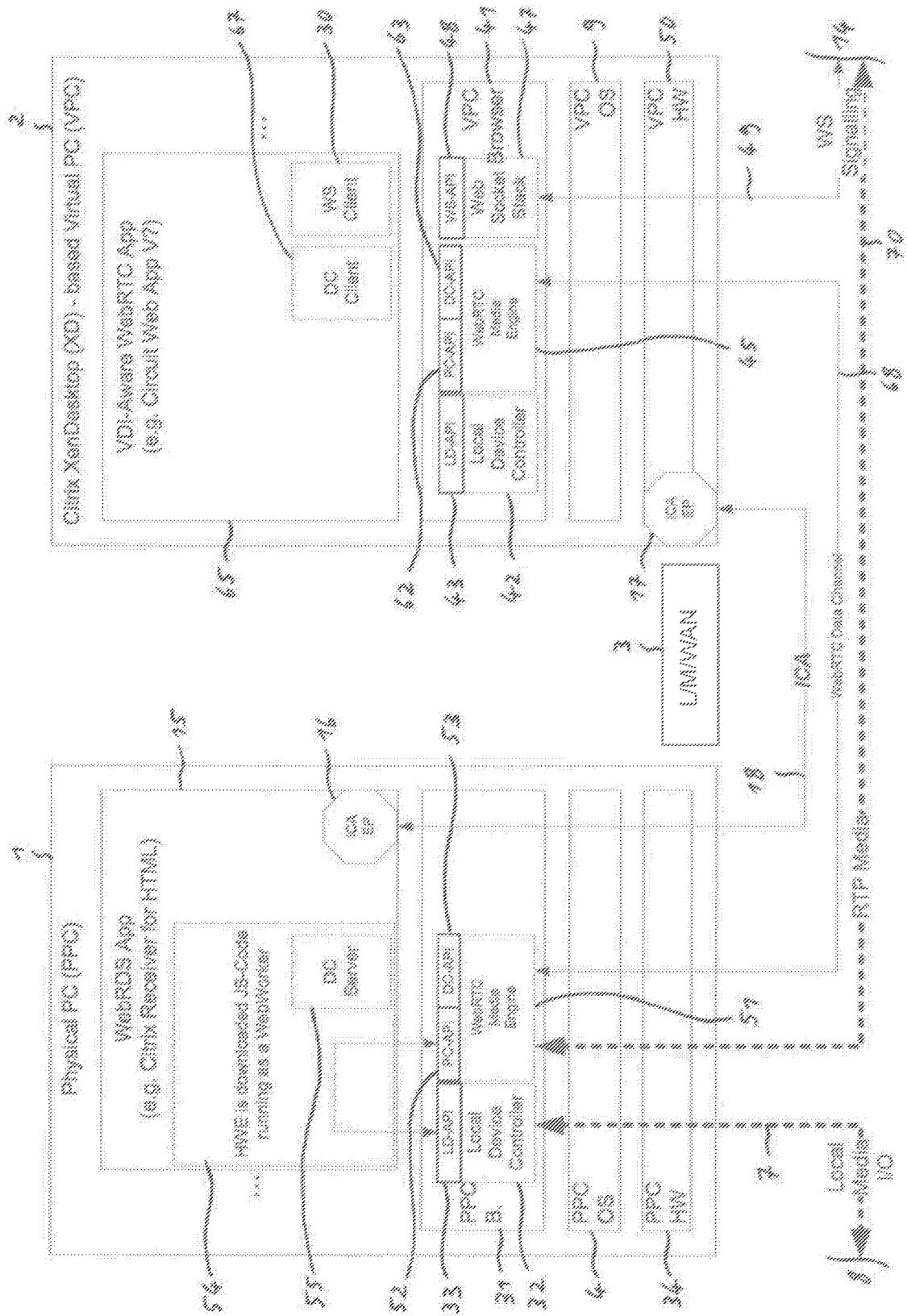
FIG. 5 is a block diagram showing a setting of a virtual desktop infrastructure (VDI) implementation according to the exemplary embodiment of the present invention in a session phase.
Figure 6:
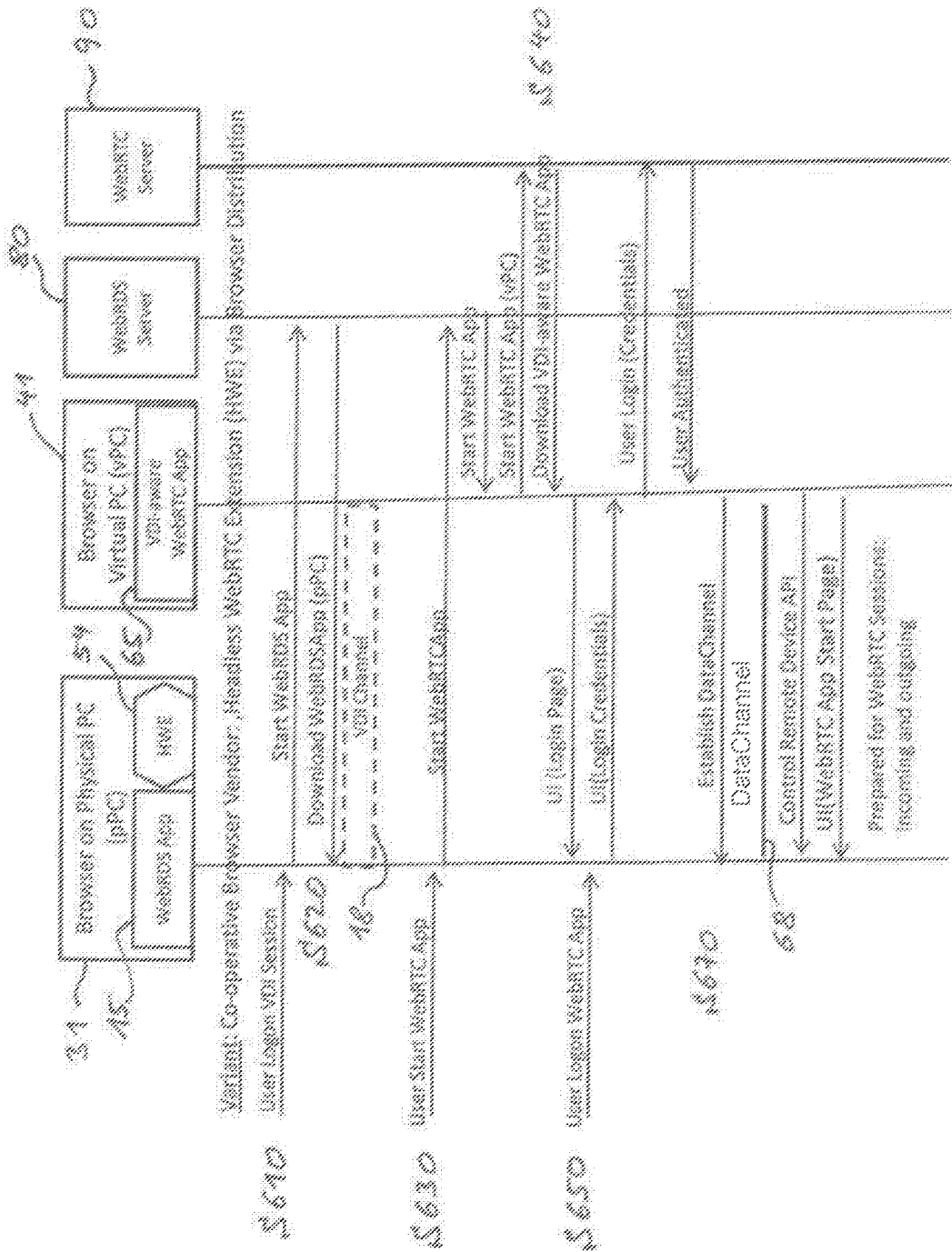
FIG. 6 is a sequence diagram of a prologue part of a method according to the exemplary embodiment of the present invention.
Figure 7:
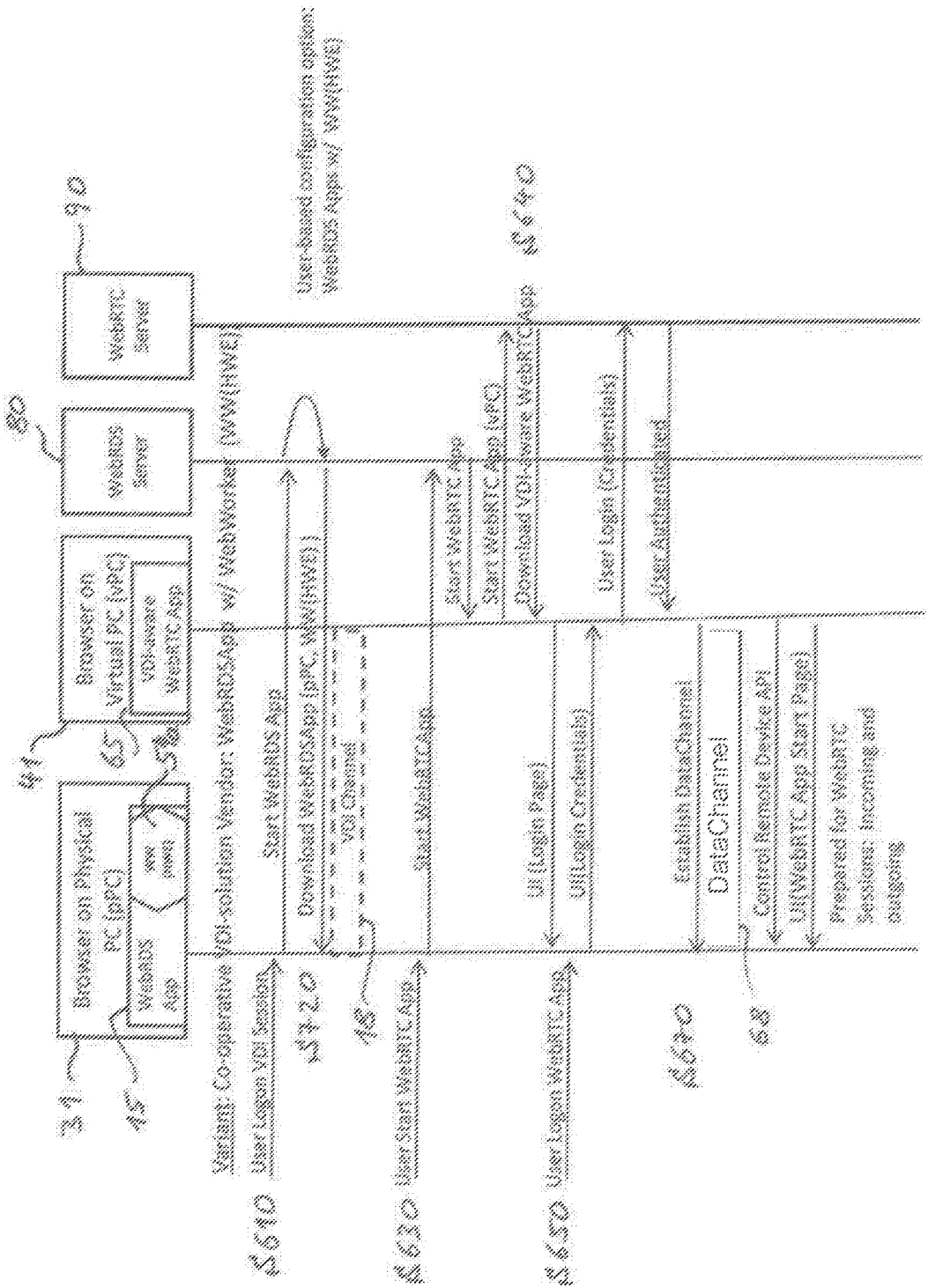
FIG. 7 is a sequence diagram of an alternative prologue part of the method according to the exemplary embodiment of the present invention.
Figure 8:
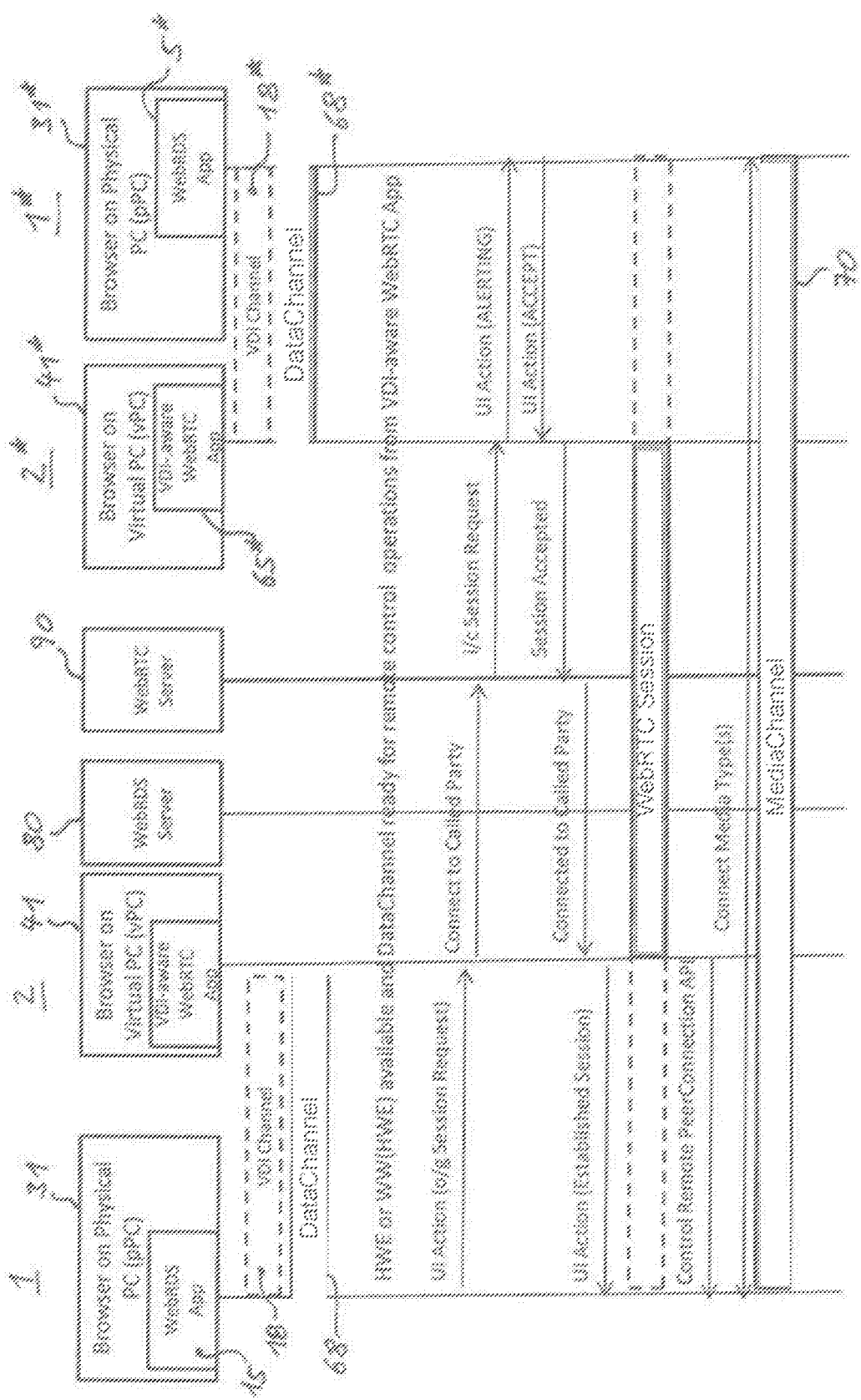
FIG. 8 is a sequence diagram of a session establishing part of the method according to the exemplary embodiment of the present invention.

Here, FIG. 4 is a block diagram of a VDI setting in an initialization phase, and FIG. 5 is a block diagram of the VDI setting in a session phase. Furthermore, FIG. 6 is a sequence diagram of a prologue part of a method of implementing real-time media data handling in a VDI environment using WebRTC, FIG. 7 is a sequence diagram of an alternative prologue part of a method of implementing real-time media data handling in a VDI environment using WebRTC, and FIG. 8 is a sequence diagram of a session establishing part of a method of implementing real-time media data handling in a VDI environment using WebRTC, said session being a session between two users where a first user is using a virtual unit through a physical unit, and a second user is any third party. Any user may be a human user or service, and the invention also covers machine-to-machine communication, human-to-human communication, and human-to-machine communication.

Figure 3:
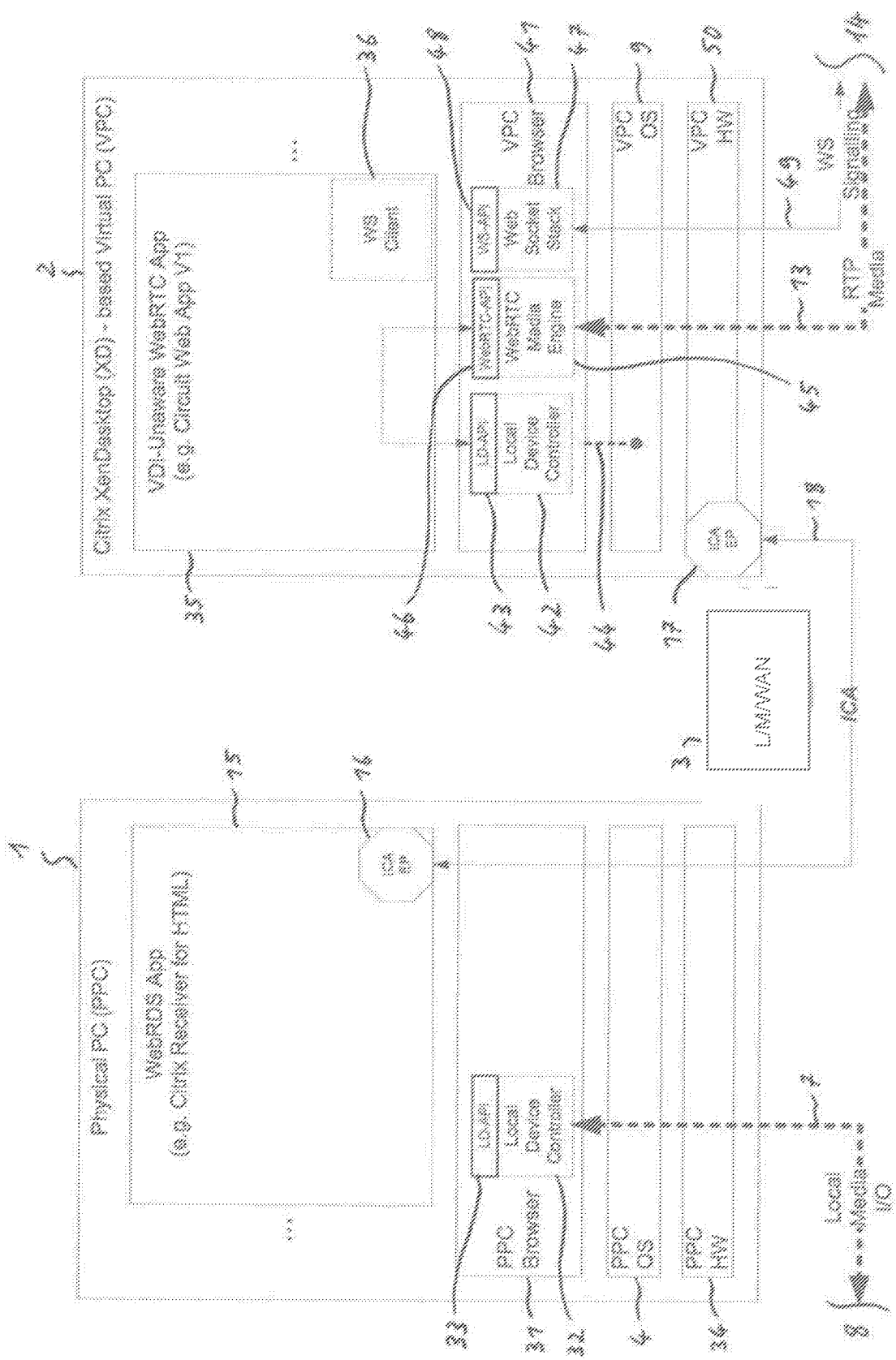
FIG. 3 is a block diagram showing a general outline of a solution where the browser is running on a Remote Desktop or a virtual PC.

The VDI implementation of the present exemplary embodiment of the invention is similar to that assumed in FIG. 3 described above so that a description of elements already introduced in the context of FIG. 3 is omitted or repeated in short, in the following.

In this exemplary embodiment, a physical unit (vPC) 1 and a virtual unit (vPC) 2 are connected via a network 3 which may be a WAN, MAN, or LAN. The physical unit 1 runs with a pPC operation system 4 (e.g., Windows) logically located above a pPC hardware (HW) layer 34, and the virtual unit 2 runs or is emulated to run with a vPC operating system 9 (e.g., Windows again) logically located above a vPC hardware (HW) layer 50. A web browser 31 is provided on the physical unit (pPC) 1, having a local device controller (LDC) 32 assigned to a local device API (LC API) 33 implemented therein, for controlling local media 8 at the user side via a Local Media I/O channel 7 in a session phase (see FIG. 5). Likewise, a web browser 41 is provided on the virtual unit (vPC) 2, having a local device controller (LDC) 42 assigned to a local device API (LC API) 43 implemented therein. An RDS client (WebRDS App) 15 is implemented at the physical unit 1, and a WebRTC App 65 is implemented at the virtual unit 2. WebRDS App 15 at the physical unit 1 may be, e.g., Citrix Receiver for HTML by Citrix, and the WebRTC App 65 at the side of the virtual unit 2 may be, e.g., a version of Circuit Web App by Unify.

In the VDI implementation of this exemplary embodiment, at the side of the physical unit 1, a WebRTC media engine (ME) 51 is implemented in pPC web browser 31, assigned to a peer connection (PC) API 52 and a data channel (DC) API 53. Furthermore, at the side of the physical unit 1, a headless WebRTC extension (HWE) 54 is implemented in WebRDS App 15. HWE 54 is downloaded JavaScript (JS) which is running as a WebWorker. A data channel (DC) server 55 is implemented in HWE 54.

At the side of the virtual unit 2, WebRTC App 65 is VDI-aware, and includes a WebSocket (WS) client 36 and a data channel (DC) client 67. The vPC web browser 41 provided at the virtual unit (vPC) 2 also has a WebRTC media engine 45 implemented therein assigned to a peer connection (PC) API 62 and a data channel (DC) API 63. As further seen in FIG. 5, vPC browser 41 includes a WebSocket stack 47 assigned to a WebSocket API 48 which are, however, omitted in FIG. 4 as they have no function in the initialization phase shown in FIG. 4.

It is to be noted at this end that WebRDS App 15 is running on pPC browser 31 while shown extracted for ease of illustration, and, likewise, WebRTC App 65 is running on vPC browser 41. Both Apps 15, 65 may be understood as tabs shown in a browser window of their respective browsers 31, 41.

In an initialization phase shown in FIG. 4, RDS client (WebRDS App) 15 of physical unit 1 communicates with the virtual PC (vPC) 2 via ICA which is a Citrix-promoted VDI protocol. To this end, an ICA EP 16 is implemented in the pPC RDS client 15, and a further ICA EP 17 is implemented at the virtual unit 2 at level of the vPC hardware (HW) layer 50, and an ICA channel 18 is established between both sides' ICA EPs 16, 17. Furthermore, a WebRTC Data Channel 68 is established between DC Client 67 of VDI-aware WebRTC App 65 at the side of the virtual unit 2 and the DC server 55 of HWE 54 implemented in WebRDS App 15 at the side of the physical unit 1. WebRTC data channel 68 is respectively lead through DC APIs 53, 63 via each WebRTC media engine 51, 45 of respective web browsers 31, 41 at the sides of the physical unit 1 and the virtual unit 2, respectively.

In a session phase shown in FIG. 5, WebSocket stack 47 is enabled to communicate with a third party 14 via WebSocket signaling channel 49. In this exemplary embodiment of the invention, media data for audio and video is transmitted according to the SRTP protocol via an SRTP media channel 70 through WebRTC media engine 51, directly between the physical unit 1 and the third party 14.

The Citrix solution bases on a native RDS client 15 running on the physical unit (pPC) 1 at the user side. Local device controller (LDC) 32 implemented in the pPC web browser 31 controls local media 8 at the user side via a Local Media I/O channel 7. It is to be remembered that the softphone client 10, here SIP-based, running on the vPC 2 according to the prior art example of FIG. 1 has no access to the physical devices 8 of the pPC 1 in respect to RTC but, there, the ICA channel 18 may be used for "tunneling" RTC payload data to the physical unit 1 so as to make them usable. However, there may be a lot of delay and loss of quality in this payload tunneling. Such problems may become worse with growing distance between the physical unit 1 and the server hosting the virtual unit 2.

According to FIG. 4, the WebRDS App 15 runs in a browser 31 at the pPC (physical unit) 1 that in turns comprises a WebRTC Media Engine 51. The concept of the present invention is to utilize this WebRTC Media Engine 51 on behalf of the one as part of the browser 41 at the vPC (virtual unit) 2.

As to the local device API 43, the peer connection API 62 and the data channel API 63, as of W3C, if a web application using WebRTC is executed in a VDI environment, only the data channel API 63 is executed and in effect on the virtual PC (virtual unit) 2 while the local device API 43 and peer connection API 62 are not in effect on the virtual unit 2.

FIG. 5 illustrates the overall VDI infrastructure for WebRTC and WebRDS applications according to this invention in a session phase. Thereby the browser 31 running the WebRDS app 15 at the physical unit 1 utilizes via the HWE 54 at the pPC 1 to control the APIs 33, 53, 52 for the local device (LD), the data channel (DC), and the peer connection (PC), respectively. The DC communicates with the DC controlled by the VDI-aware WebRTC app 65 at the virtual unit 2. The VDI-aware WebRTC app 65 remotely controls the LD and PC APIs 33, 52 via the Data Channel 68 thru the HWE 54 at the pPC 1 instead of the LD and PC APIs 43, 62 at the vPC 2 to achieve the wanted technical effect.

FIG. 6 is a sequence diagram of a prologue part of a method according to an exemplary embodiment of the present invention. As a prerequisite for the method's prologue part shown in FIG. 6 a co-operating browser vendor distributes a browser-specific 'headless' WebRTC extension (HWE) 54, which supports the remote control of the WebRTC APIs standardized by W3C such as PC API 52, DC API 53 in FIGS. 4 and 5.

When the user powers on his/her physical PC or unit (pPC) 1 the local operating system 4 and the WebRTC-enabled browser 31 with the HWE 54 gets started.

When the user logs on to access his/her remote desktop at the vPC or virtual unit 2 (step S610), the WebRDS app 15 is downloaded to the browser 31 at the pPC 1 from a WebRDS server 80 (step S620), e.g. as a new tab in the browser 31 and a VDI channel (ICA channel 18) is established between the app and the WebRDS front-end. This ICA channel 18 is typically used to convey man-to-machine interactions between the physical devices of the pPC 1 and the virtual devices of the vPC 2.

As soon as the user clicks on the WebRTC App Icon presented at a mirrored screen of the pPC 1 (step S630), the download of the VDI-aware WebRTC App 65 from a WebRTC server 90 is started (S640) and typically another authentication is required from the user (S650).

As soon as the user is authenticated the data channel 68 for the purpose of this invention is securely established by the VDI-aware WebRTC app 65 at the vPC 2 towards the HWE 54 running in the browser 31 at the pPC 1 (step S670).

As soon as the WebRTC data channel 68 is established, the HWE 54 at the pPC 1 side can be remotely controlled by the VDI-aware WebRTC app 65 at the vPC 2. Now HWE 54 is ready to initiate or terminate media channels for the WebRTC session on behalf of the vPC 2.

FIG. 8 illustrates an establishment of a WebRTC session with media channels as disclosed in this invention. It is assumed in this example that both parties of the session use a similar, i.e., inventive VDI environment as proposed by this specification. In FIG. 8, instances of a first party are indicated by plain reference numbers while instances of a second party are indicated by asterisked reference numbers (suffixed by a "*"). WebRDS server 80 and WebRTC server 90 are assumed to be represented by a shared resource. WebRDS server 80 and WebRTC server 90 may optionally be distributed instances.

As an example, the user clicks on the "initiate session" button of the WebRTC app 65, which is rendered thru the VDI channel 18 from the vPC 2. In turns, the VDI-aware WebRTC app 65 communicates with the WebRTC server 90 running the WebRTC front-end services. If the called party is online, i.e. has the WebRTC app 65* started and the user is logged in, the WebRTC front-end (server 90) can route the session towards the called user. Although it works the same with a peer user in a regular WebRTC environment, FIG. 8 shows the called user in a VDI environment, too.

Once the called user has accepted the session the WebRTC session is established. This in indicated via the WebRTC front-end (server 90) maintaining the session towards the VDI-aware WebRTC app 65. This app 65 starts remote control of the media capture of the microphone, camera, or screen and the media replay via speakers and display via the local device API at the pPC 1.

Furthermore, establishment of the media channel(s) 70 as negotiated with the session protocol is/are initiated via the W3C PeerConnection API. Both protocols are controlled via the WebRTC data channel 68 as disclosed in this invention.

FIG. 7 is a sequence diagram of an alternative prologue part of the inventive method. Here, e.g. if the browser vendor is not willing to support the HWE 54 as part of the browser distribution, a WebWorker 54*a*, i.e. JavaScript code running in a separate thread without UI interaction, is downloaded and started as part of the WebRDS app 15 (step S720). This requires co-operation with the VDI vendor to offer the JavaScript-based implementation of an HWE equivalent 54*a* as part of the WebRDS app 15. It is up to the operator of this WebRDS environment to enable this option on a per-user base if WebRTC support is needed.

This invention resolves the technical problem in a highly desirable fashion. The communication peer communicates regarding the media flows directly with the pPC the user is effectively using. I.e. the IP addresses are from the PC of the media source and sink and not from a relaying entity. Since the VDI-aware procedures finally flow into the normal procedures of a regular WebRTC media engine, the solution is future-proof to extensions of the WebRTC media engine. E.g. it is intended to authenticate the communication peers of HTML5 browsers crosswise against an authentication service to trust one another. Since the WebRTC media engine runs in such a browser running on the PC the user is operating there is no break in the trust relation.

As an important extension of this invention for security reasons the WebRTC data channel is always established from the vPC to the pPC preferably after user authentication of the WebRTC application user. In the course of the user authentication a security token (e.g. OAuth2.0 authentication token) can be obtained and conveyed with the WebRTC data channel establishment request. The authentication token can be evaluated by the pPC in advance with the issuing authority (e.g. OAuth2.0 authentication server) before the incoming WebRTC data channel is accepted.

As an alternative to the usage of a physical PC (aka fat client), this invention can also be applied to thin clients starting the WebRDS app as default application, e.g. a browser-based operating system for which the browser is also the desktop application and the WebRDS front-end URL as the start page.

Another alternative to fat or thin clients could be a zero footprint client. In contrast to the thin client, for which at least the browser-based operating system has to be installed on the device, the zero footprint client bootstraps of the complete software (SW) image from the network.

Figure 9:
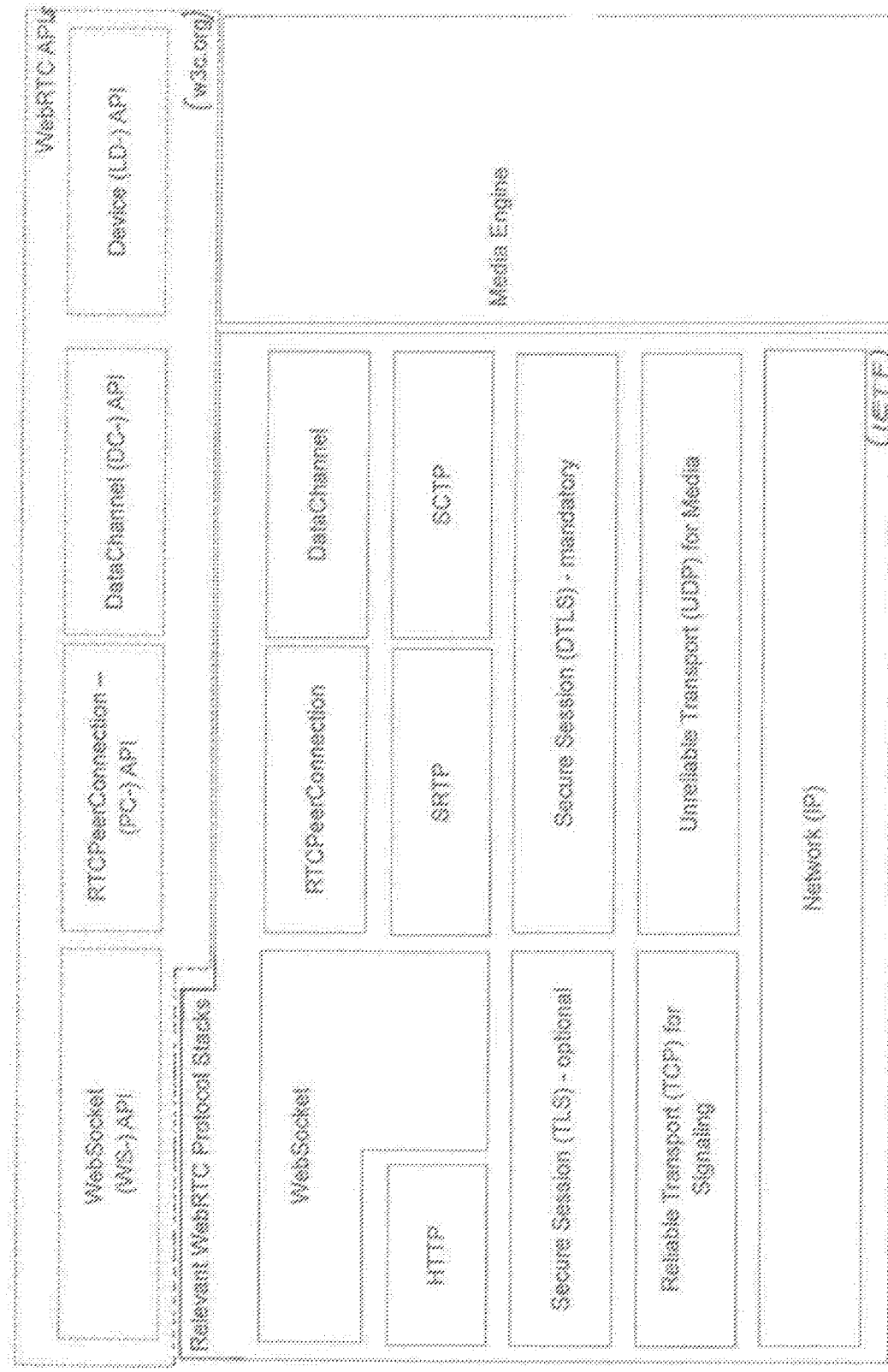
FIG. 9 is a block diagram showing a general protocol layering and related API overview of the standardized WebRTC stack as of IETF and W3C.

For reference, a general protocol layering and related API overview of the standardized WebRTC stack as of IETF and W3C, as used as an underlying architecture of the present invention as well as in the prior art, is shown in FIG. 9.

As shown in FIG. 9, a number of WebRTC APIs are defined by W3C, and a number of WebRTC protocol stacks are defined by IETF. Each WebRTC API is assigned to elements showing up right below.

The RTCPeerConncetion (PC) API which peer connection APIs (PC APIs) 52, 62 in FIGS. 4 and 5 refer to is used to trigger or terminate the media channels towards the third party. The device (LD) API which local device APIs (LD APIs) 33, 43 in FIGS. 3 to 5 refer to is used to capture or replay media from or via the corresponding local devices. The DataChannel (DC) API is referred to by data channel APIs (DC APIs) 53, 65 in FIGS. 4 and 5. For the purpose of this invention, the DataChannel (DC) API is not established towards the third party but is rather established between the first web browser 31 of the virtual unit 1 towards the second web browser 41 of physical unit 2 for controlling said PC API 52 and LD API 33 at the physical unit 1 remotely on behalf of the corresponding virtual unit APIs in concerned RDS and VDI environments. The WebSocket (WS) API which WebSocket API (WS API) 48 in FIGS. 3 and 5 refer to is only shown for completeness and is used for conveying non-standardized signalling between the WebRTC server and the WebRTC App, be it VDI-aware as according to the present invention (FIG. 5) or non-VDI-aware as in the prior art (FIG. 3). A media engine which WebRTC media engines 45, 51 in FIGS. 3 to 5 refer to is provided for encoding and decoding of voice, video, and data streams is assigned to LD API.

Specific features of the invention as described above with reference to the exemplary embodiments, may also be implemented in other embodiments, variations or modifications unless such implementations impose their own prohibitions.

It will be noted that the present invention is applicable not only in a virtual desktop but also in a remote desktop environment. In other words, the virtual unit or virtual desktop unit may include remote desktop units as well.

The use of the WebRTC data channel was described for controlling browser functions in the context of transferring real time data such as media data, and others. However, files or other non-real-time-critical content may as well be transferred from the physical unit to the virtual unit utilizing said WebRTC data channel.

The invention claimed is:

1. A communication apparatus for controlling accessible one or more browser functions of a physical side of a remote or virtual desktop environment, comprising: a physical unit of a user on the physical side, the physical unit configured to set up a virtual desktop infrastructure (VDI) between the physical unit and a virtual unit assigned to said user, on a virtual or remote side; the physical unit having a first web browser and a local device controller that is assigned to a local device application programming interface (API) for controlling local media via a local media channel; the virtual unit having a second web browser; each of the first web browser and the second web browser has at least one browser function related to real-time data communication, wherein a VDI-aware Web Real-Time Communication (WebRTC) application is implemented in the second web browser in the virtual unit and a Web Remote Desktop Service (Wards) application is implemented in the first web browser in the physical unit; said WebRDS application implemented in the first web browser and the VDI-aware WebRTC application implemented in the second web browser are configured to establish a WebRTC data channel between a first WebRTC media engine of the first web browser and a second WebRTC media engine of the second web browser; and said virtual unit configured to utilize said WebRTC data channel established between the physical unit and the virtual unit so that the VDI-aware WebRTC application implemented in the second web browser controls said at least one browser function of said first web browser running at the physical unit to remotely control the local device controller of the physical unit that is assigned to the local device API for controlling local media via a local media channel.

2. The communication apparatus of claim 1, wherein each of said at least one browser function relates to real-time data handling at the physical unit for media data that includes at least one of audio data, video data, speech data, transaction data, and gaming data.

3. The communication apparatus of claim 1, wherein the at least one browser function includes at least one of: utilizing said WebRTC data channel invoking media capturing or replaying capabilities of devices of the physical unit, and an RTC peer connection API utilizing said WebRTC data channel invoking corresponding WebRTC protocols establishing a real-time data connection from the physical unit to a third party on behalf of the virtual unit.

4. The communication apparatus of claim 1, wherein the first WebRTC media engine is enabled and assigned to a first data channel API implemented in said first web browser running at the physical unit and the second WebRTC media engine is enabled and assigned to a second data channel API implemented in said second web browser running at the virtual unit.

5. The communication apparatus of claim 1, wherein said at least one browser function includes capturing or replay of end-to-end real-time data delivered or received towards a third party, and wherein said local device API is enabled in said first web browser run at the physical unit.

6. The communication apparatus of claim 1, wherein a head-less WebRTC extension is implemented in the WebRDS application implemented in the first web browser in the physical unit, said head-less WebRTC extension comprising a data channel server cooperable with a first data channel API assigned to said first WebRTC media engine enabled in said first web browser running at the physical unit.

7. The communication apparatus of claim 6, wherein the head-less WebRTCextension is a downloaded JavaScript code.

8. The communication apparatus of claim 6, further comprising a step of downloading said WebRDS application to said first web browser running at said physical unit from a remote WebRDS server, said WebRDS application including said head-less WebRTC extension.

9. The communication apparatus of claim 6, wherein said head-less WebRTCextension is implemented in said first web browser independently from said WebRDS application.

10. The communication apparatus of claim 1, wherein said VDI-aware WebRTC application comprises a WebSocket client cooperable with a WebSocket stack implemented and assigned to a WebSocket API enabled in said second web browser run at the virtual unit.

11. A server comprising:
a processor connected to a non-transitory computer readable medium, the server configured to provide a virtual desktop unit for a physical unit when connected via a network so that web btowser runs at said virtual desktop unit and a WebRTC data channel established between said web browser and a further web browser running at said physical unit, the server configured to control accessible browser functions of said further web browser running at the physical unit utilizing said WebRTC data channel.

12. The server of claim 11, wherein the server is configured to control the accessible browser functions of said further web browser running at the physical unit utilizing said WebRTC data channel via a control process comprising: controlling the further web browser so that a virtual desktop infrastructure (VDI) WebRTC application remotely controls a local device controller of the physical unit that is assigned to a local device application programming interface (API) for controlling local media via a local media channel.

13. The server of claim 12, wherein the accessible browser functions of said further web browser relates to real-time data handling at the physical unit for media data that includes at least one of audio data, video data, speech data, transaction data, and gaming data.

14. The server of claim 12, wherein the accessible browser functions of said further web browser includes at least one of: utilizing said WebRTC data channel to invoke media capturing or replaying capabilities of devices of the physical unit, and an RTC peer connection API utilizing said WebRTC data channel to invoke corresponding WebRTC protocols establishing a real-time data connection from the physical unit to unit to a third party on behalf of the virtual unit.

15. The server of claim 12, wherein the accessible browser functions of said further web browser includes capturing or replaying of end-to-end real-time data delivered or received towards a third party.

16. The server or claim 12, wherein said WebRTC data channel is establishable between a first WebRTC media engine enabled and assigned to a first data channel API implemented in said further web browser running at the physical unit and a second WebRTC media engine enabled and assigned to a second data channel API implemented in said web browser running at the virtual unit.

17. A method of controlling one or more accessible browser functions of a physical side of a remote or virtual desktop environment, said method comprising: setting up a virtual desktop infrastructure (VDI) between a physical unit of a user on a physical side, and a virtual unit assigned to said user, on a virtual or remote side; running a first web browser at the physical unit and a second web browser at the virtual unit, wherein each web browser has at least one browser function, wherein the VDI-aware application is implemented in the second web browser in the virtual unit that is assigned to a WebSocket application programming interface (API) enabled in said second web browser wherein said VDI-aware application is implemented by a client cooperable with a Web Real-Time Communication (WebRTC) API assigned to a media engine enabled in said second web browser running at the virtual unit; establishing a WebRTC data channel between a first media engine of the first web browser and a second media engine of the second web browser; controlling said at least one browser function of said first web browser running at the physical unit remotely by the virtual unit utilizing the WebRTC data channel established between the physical unit and the virtual unit.

18. The method of claim 17, wherein the WebRTC data channel is established between a first WebRTC media engine enabled and assigned to a first WebRTC API implemented in said first web browser running at the physical unit and a second WebRTC media engine enabled and assigned to a second WebRTC API implemented in said second web browser running at the virtual unit.

19. The method of claim 17, wherein the at least one browser function of said first web browser relates to real-time data handling at the physical unit for media data that includes audio data, video data, speech data, transaction data, and/or gaming data.

* * * * *

UNITED STATES PATENT AND TRADEMARK OFFICE
CERTIFICATE OF CORRECTION

| | |
|---|---|
| PATENT NO. | : 11,354,374 B2 |
| APPLICATION NO. | : 16/694094 |
| DATED | : June 7, 2022 |
| INVENTOR(S) | : Karl Klug et al. |

It is certified that error appears in the above-identified patent and that said Letters Patent is hereby corrected as shown below:

On the Title Page

After Item (63), the Related U.S. Application Data, insert the following missing Foreign Application Priority Data:
--(30) Foreign Application Priority Data
May 6, 2015 (DE) ........................ 102015005815.0--.

In the Claims

In Claim 7, Column 13, Line 30, "WebRTextension" should read --WebRT extension--.

In Claim 9, Column 13, Line 38, "WebRTextension" should read --WebRT extension--.

In Claim 13, Column 14, Lines 3-4, "the accessible browser functions of said further web browser relates" should read --the accessible browser functions of said further web browser relate--.

In Claim 14, Column 14, Lines 8-9, "the accessible browser functions of said further web browser includes" should read --the accessible browser functions of said further web browser include--.

In Claim 14, Column 14, Line 15, "physical unit to unit to a third party" should read --physical unit to a third party--.

In Claim 15, Column 14, Lines 17-18, "the accessible browser functions of said further web browser includes" should read --the accessible browser functions of said further web browser include--.

In Claim 16, Column 14, Line 21, "server or claim 12," should read --server of claim 12,--.

Signed and Sealed this
Thirtieth Day of August, 2022

Katherine Kelly Vidal
*Director of the United States Patent and Trademark Office*